United States Patent [19]

Fukuhara et al.

[11] Patent Number: 5,807,174
[45] Date of Patent: Sep. 15, 1998

[54] METHOD OF ASSISTING PLAYER IN ENTERING COMMANDS IN VIDEO GAME, VIDEO GAME SYSTEM, VIDEO GAME STORAGE MEDIUM, AND METHOD OF CONTROLLING VIDEO GAME

[75] Inventors: Kenichi Fukuhara, Tokyo; Masayuki Tarao, Kasukabe; Masaaki Suzuki, Tokyo; Kouji Igarashi, Chofu, all of Japan

[73] Assignee: Konami Co., Ltd., Hyogo-ken, Japan

[21] Appl. No.: 728,979

[22] Filed: Oct. 11, 1996

[30] Foreign Application Priority Data

Oct. 12, 1995 [JP] Japan .................................. 7-264563

[51] Int. Cl.⁶ ........................................................ A63F 9/24
[52] U.S. Cl. ............................................................. 463/31
[58] Field of Search .................................. 463/30, 31, 32, 463/33, 34, 2; 345/425, 427; 705/7

[56] References Cited

U.S. PATENT DOCUMENTS 5,233,513  8/1993  Doyle .......................................... 705/7
5,689,561  11/1997  Pace ............................................ 463/2
5,692,114  11/1997  Imai ......................................... 345/427

OTHER PUBLICATIONS

Instruction Manual for computer game by Konami Co., Ltd. of Japan, copyright 1994.

Instruction Manual for computer game by Konami Co., Ltd. of Japan, ("forever with you"), copyright 1995.

Primary Examiner—George Manuel
Attorney, Agent, or Firm—Greenblum & Bernstein P.L.C.

[57] ABSTRACT

Commands are entered in a video game by the player to determine an action of a player character for thereby determining an action and an image of at least one opponent character. A plurality of icons representing respective commands for the player character and a movable cursor are displayed on a displayed image, and the movable cursor positioned on one of the icons is detected. Then, the one of the icons is enlarged in size based on the detected movable cursor to assist the player of the video game in entering the command represented by the one of the icons.

15 Claims, 17 Drawing Sheets

FIG. 15

| INITIALLY ENTERED NAMES | SURNAME | SAOTOME |
| --- | --- | --- |
| | INDIVIDUAL NAME | YOSHIO |
| | NICKNAME | YOCCHIN |

FIG. 17

| LEVEL | NAME |
|---|---|
| A | SAOTOMESAN |
| B | SAOTOMEKUN |
| C | YOSHIOSAN |
| D | YOSHIOKUN |
| E | YOSHIO |
| F | YOCCHIN |

METHOD OF ASSISTING PLAYER IN ENTERING COMMANDS IN VIDEO GAME, VIDEO GAME SYSTEM, VIDEO GAME STORAGE MEDIUM, AND METHOD OF CONTROLLING VIDEO GAME

BACKGROUND OF THE INVENTION

1. Field of the Invention

The present invention relates to a method of assisting the player of a video game, such as a role playing game (RPG), in entering commands for a player character to have a simulated experience of certain aspects of everyday life on a video display screen on behalf of the player of the video game, a video game system for performing such a video game, a video game storage medium which stores such a video game, and a method of controlling such a video game performed by such a video game system.

2. Description of the Related Art

Role playing games (RPGs) that can be played as a video game on a video display screen allow the player to control a displayed player character to have a simulated experience of certain aspects of life on the video display screen on behalf of the player. Typical role playing games are characterized by a player character walking around medieval mountains, fields, towns, and caves and fighting and winning against enemy characters in an effort to achieve some goal. Such role playing games are known as combat-type role playing games.

According to some recent versions of role playing games, the player can control a displayed player character to grow or enjoy a simulated love in various stages of everyday life, such as social life, student life, etc.

While a role playing game is being played on a video display screen by the player, the player enters many commands through switches on a controller that is held by the player for determining an action of a player character displayed on the video display screen. Usual video display screens have a low resolution and suffer a limitation on the number of alphanumeric characters that can be displayed compared with personal computer display screens. Therefore, it has been customary for the player of a role playing game to enter commands using a group of icons displayed on the video display screen. The use of icons for entering commands, however, is disadvantageous in that the icons displayed on the video display screen hide part of the displayed game image, tending to let the player lose interest in the game. One solution would be to display the icons in a smaller size, but would cause another problem in that the player would find it difficult to select desired icons from the smaller displayed icons.

When playing a role playing game for experiencing a simulated love, the player continues the game in an effort to arouse the feeling of an opponent character toward a player character on behalf to the player. In such a role playing game, unlike the combat-type role playing games, the player is likely to develop an affectionate feeling for the opponent character and have joy or sorrow depending on the attitude of the opponent character toward the player character. The player finds the game more interesting as what the opponent character says and does changes as the game goes on.

SUMMARY OF THE INVENTION

It is therefore an object of the present invention to provide a method of assisting the player of a video game, such as a role playing game (RPG), in efficiently entering commands.

Another object of the present invention is to provide a video game system for performing such a video game.

Still another object of the present invention is to provide a video game storage medium which stores such a video game.

Yet still another object of the present invention is to provide a method of controlling such a video game performed by such a video game system.

According to an aspect of the present invention, there is provided a method of assisting a player of a video game in entering commands to determine an action of a player character for thereby determining an action and an image of at least one opponent character in the video game, comprising the steps of displaying a plurality of icons representing respective commands for the player character and a movable cursor on a displayed image, detecting the movable cursor positioned on one of the icons, and enlarging the one of the icons in size based on the detected movable cursor to assist a player of the video game in entering the command represented by the one of the icons.

The one of the icons may be reduced in size a predetermined period of time after the one of the icons is enlarged in size. The one of the icons may be enlarged in progressively greater sizes, and may be reduced in progressively smaller sizes.

According to another aspect of the present invention, there is also provided a video game system comprising display means for displaying a player character whose action is determined by at least entering commands, an opponent character action and image are determined by the action of the player character, a plurality of icons representing the commands, respectively, and a movable cursor, a controller for moving the displayed movable cursor to indicate one of the icons to enter the command represented by the one of the icons, detecting means for detecting the position of the displayed movable cursor, and display control means for displaying the one of the icons in an enlarged size based on the position detected by the detecting means.

According to still another aspect of the present invention, there is also provided a video game storage medium storing a video game program of a video game which is played by entering commands to determine an action of a player character for thereby determining an action and an image of at least one opponent character in the video game, displaying a plurality of icons representing respective commands for the player character and a movable cursor on a displayed image, detecting the movable cursor positioned on one of the icons, and enlarging the one of the icons in size based on the detected movable cursor.

According to yet still another aspect of the present invention, there is also provided a method of controlling a video game to determine an action of a player character for thereby determining an action and an image of at least one opponent character in the video game, comprising the steps of establishing a plurality of zones depending on excitement and friendship factors of the opponent character with respect to the player character, selecting an action of the player character to increase affectionate feelings of the opponent character for the player character according to a characteristic curve of the opponent character, and determining an action of the opponent character toward the player character based on one of the zones which is traversed by the characteristic curve of the opponent character.

Each of the zones may be associated with one of a plurality of different levels representing respective different names of the player character, and the action of the opponent character may comprise a presentation of one of the names which is associated with the one of the zones. The opponent character may have a plurality of alternative different characteristic curves selectable depending on the excitement and friendship factors.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 15 is a table of names registered in an initializing routine;

FIG. 17 is a table of names corresponding to different levels.

DETAILED DESCRIPTION OF THE PREFERRED EMBODIMENTS

Figure 1:
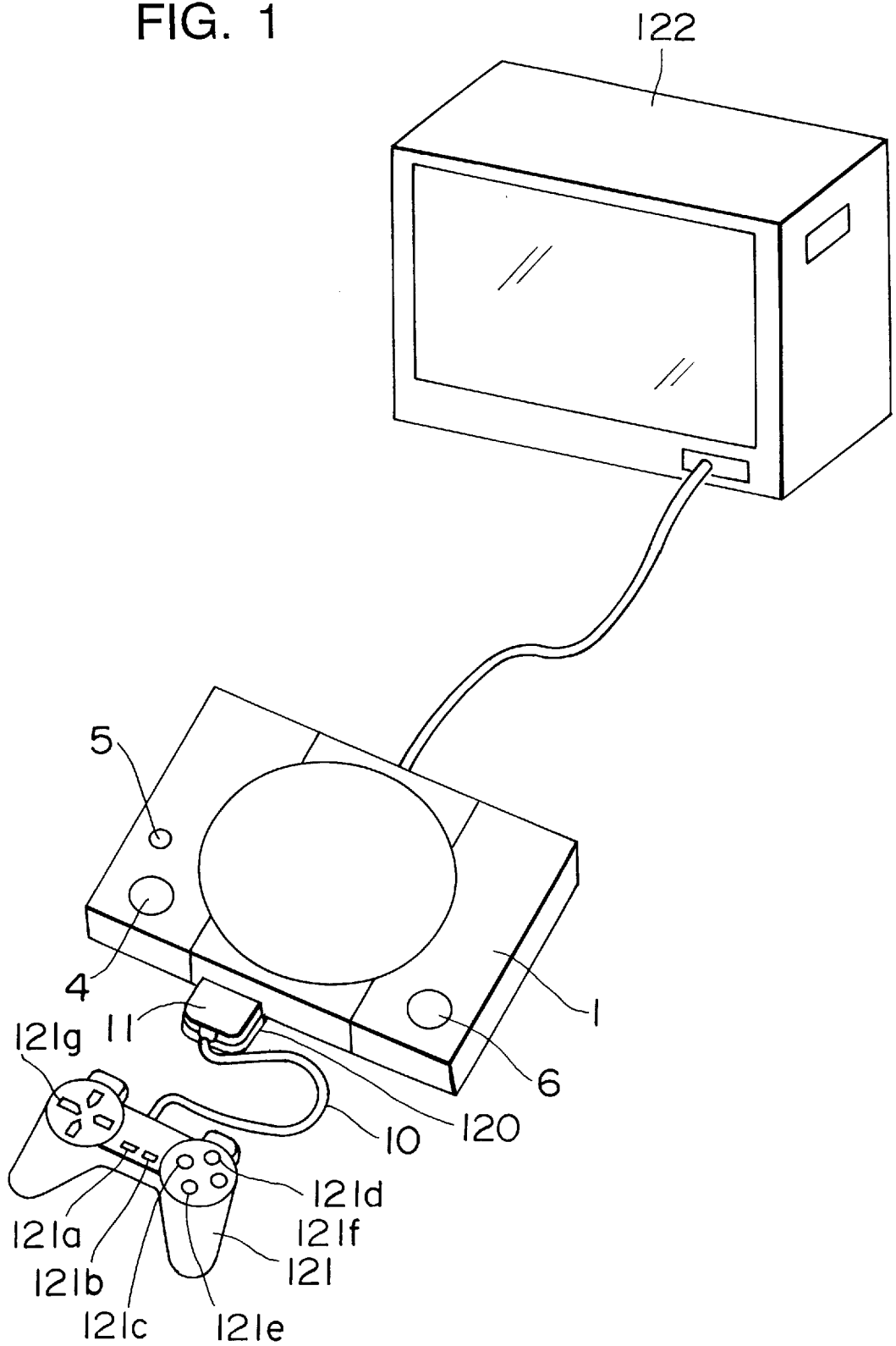
FIG. 1 is a perspective view of a video game system for playing a video game according to an embodiment of the present invention.

Like or corresponding parts are denoted by like or corresponding reference numerals throughout views.

As shown in FIG. 1, a video game system for playing a video game according to the present invention generally comprises a game machine 1 for loading a CD-ROM 123 (see FIG. 2) as a game storage medium in a circular region thereof, a television display monitor 122 connected as a display means to the game machine 1, and a controller 121 connected to the game machine 1 through a cable 10 having a connector 11 that is fitted into the game machine 1.

The game machine 1 has a power supply switch 4 for turning on and off the supply of electric power to the game machine 1, a reset switch 5 for resetting the video game system, and a switch 6 for opening a lid which closes the circular region that stored the CD-ROM 123.

Figure 2:
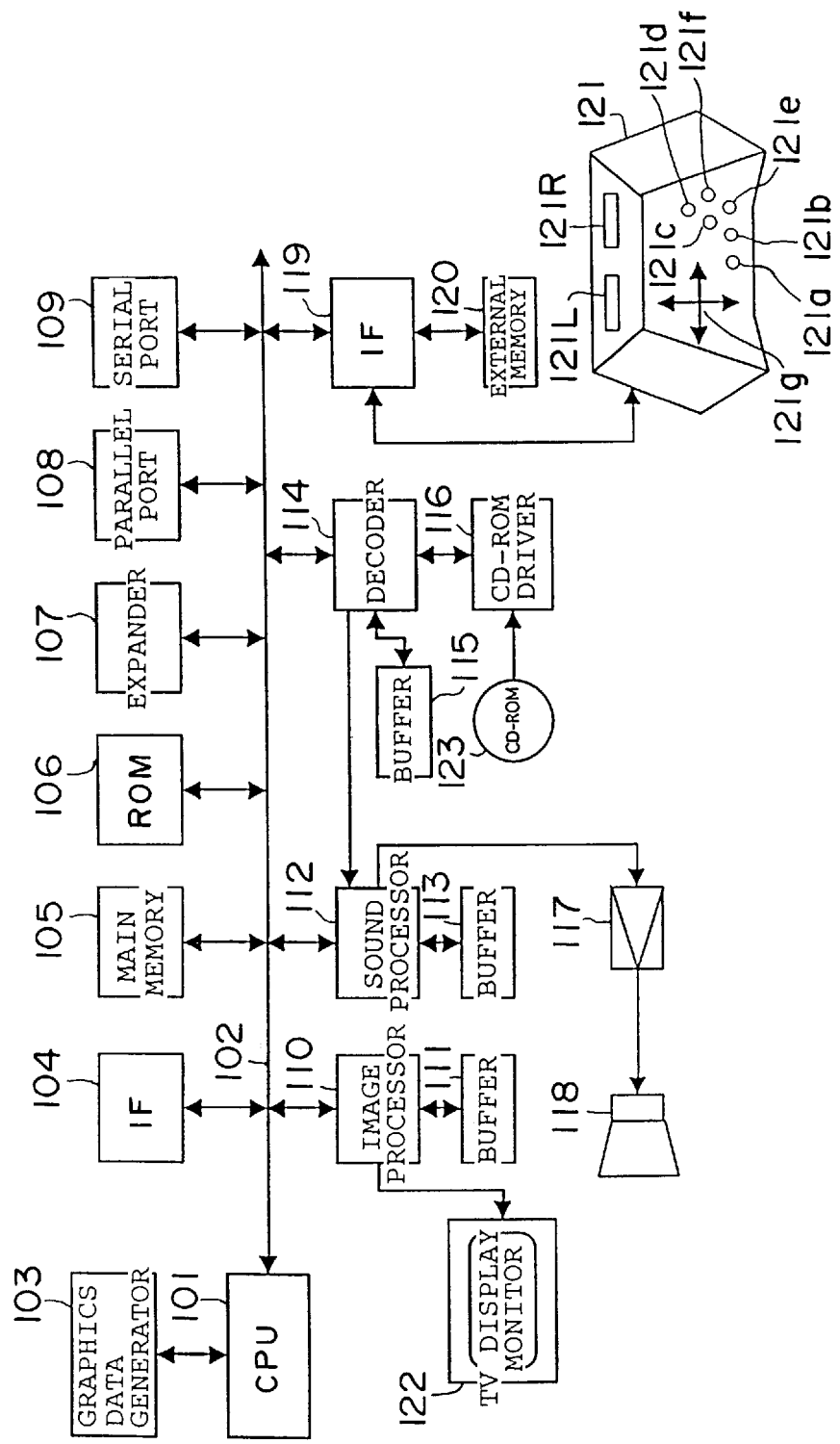
FIG. 2 is a block diagram of an electric arrangement of the video game system shown in FIG. 1.

FIG. 2 shows in block form the video game system shown in FIG. 1.

As shown in FIG. 2, the game machine 1 comprises a CPU 101, a graphics data generator 103 directly connected to the CPU 101, an interface 104 connected to the CPU 101 through a bus 102 which includes an address bus, a data bus, and a control bus, a main memory 105 connected to the CPU 101 through the bus 102, a ROM 106 connected to the CPU 101 through the bus 102, an expander 107 connected to the CPU 101 through the bus 102, a parallel port 108 connected to the CPU 101 through the bus 102, a serial port 109 connected to the CPU 101 through the bus 102, an image processor 110 connected to the CPU 101 through the bus 102, a sound processor 112 connected to the CPU 101 through the bus 102, a decoder 114 connected to the CPU 101 through the bus 102, and an interface 119 connected to the CPU 101 through the bus 102. The game machine 1 also includes a buffer 111 connected to the image processor 110, a buffer 113 connected to the sound processor 112, an amplifier 117 connected to the sound processor 112, a loudspeaker 118 connected to the amplifier 117, a buffer 115 connected to the decoder 114, a CD-ROM driver 116 connected to the decoder 114, and an external memory 120 connected to the interface 119. As shown in FIG. 1, the external memory 120 can detachably be mounted on the game machine 1, and has the same shape as the connector 11 of the cable 10.

When the CD-ROM 123 is loaded in the circular region of the game machine 1, it is played back by the CD-ROM driver 116. The controller 121 is connected to the interface 119. The television display monitor 122 is connected to the image processor 110.

The graphics data generator 103 serves as a co-processor for the CPU 101. Specifically, the graphics data generator 103 transforms coordinates and calculates light sources, e.g., calculates matrixes and vectors with fixed points, according to parallel processing. Main processing tasks performed by the graphics data generator 103 are a process of determining addresses in display areas of processed images based on coordinate data, motion data, and rotation data of respective vertexes in a two- or three-dimensional plane of image data supplied from the CPU 101, and returning the determined addresses to the CPU 101, and a process of calculating the brightness of an image depending on the distance and angle from a hypothetically established light source.

The interface 104 serves to interface peripheral devices, e.g., a pointing device such as a mouse, a track ball, etc., to the bus 102. The ROM 106 stores the data of a program as an operation system of the game machine 1. The main memory 105 is a memory for loading a game program from the CD-ROM 123 that is played by the CD-ROM driver 116. The data of the game program are paged from the main memory 105 into the CPU 101, and processed by the CPU 101.

The expander 107 serves to expand image data which have been compressed by an intraframe coding process according to MPEG (Moving Picture Experts Group) or JPEG (Joint Photographic Experts Group), through decoding data encoded by VLC (Variable Length Code), inverse quantizing, IDCT (Inverse Discrete Cosine Transform), recovering intraframe-coded images.

The image processor 110 generates and stores an image to the buffer 111 and outputs the image stored in the buffer 111 to the television display monitor 122 in response to an image display command issued by the CPU 101. The buffer 111 includes a display area and a non-display area. The display area is an area for storing data to be displayed on the display screen of the television display monitor 122, and the non-display area is an area for storing texture data, color pallet data, etc. The texture data are two-dimensional image data, and the color pallet data are data for indicating colors for the texture data. Image display commands issued by the CPU 101 include a command for displaying a line, a command for displaying a three-dimensional image using polygons, and a command for displaying an ordinary two-dimensional image, among others.

The sound processor 112 stores ADPCM data read from the CD-ROM 123 into the buffer 113, reads the ADPCM data from the buffer 113 at a clock frequency of 44.1 kHz, and processes the read ADPCM data by changing the pitch, adding noise, establishing an envelope, establishing a level, and adding reverberation. If sound data read from the CD-ROM 123 are PCM data, then the PCM data are converted into ADPCM data by the sound processor 112. The ADPCM data processed by the sound processor 112 are supplied through the amplifier 117 to the loudspeaker 118, which reproduces sound.

The CD-ROM driver 116 reads program data, data such as map information, and audio data from the CD-ROM 123, and supplies the read data to the decoder 114.

The decoder 114 effects an error correcting process using an ECC (Error Correcting Code) on the data supplied from the CD-ROM driver 116, and supplies the error-corrected data to the main memory 105 or the sound processor 112.

The external memory 120 comprises a card-shaped memory for storing various parameters to hold various status data in the event of an interruption of the game.

The controller 121, which is shown in FIG. 2 somewhat differently from the controller 121 in FIG. 1 for illustrative purpose, has a cross key 121g comprising an integral combination of left, right, up, and down keys, a left pushbutton 121L, a right pushbutton 121R, a start pushbutton 121a, a select pushbutton 121b, and first through fourth pushbuttons 121c through 121f. The cross key 121g allows the player to give commands indicative of left, right, up, and down movements to the CPU 101. The start pushbutton 121a is pushed by the player to instruct the CPU 101 to start the game program loaded from the CD-ROM 123. The select pushbutton 121b is pushed by the player to instruct the CPU 101 to make various selections with respect to the game program which is loaded in the main memory 105.

The television display monitor 122, which may be an ordinary television receiver, receives image and sound data from the game machine 1 through video and audio input terminals or an RF terminal, and displays the image data and reproduces the sound data.

Figure 3:
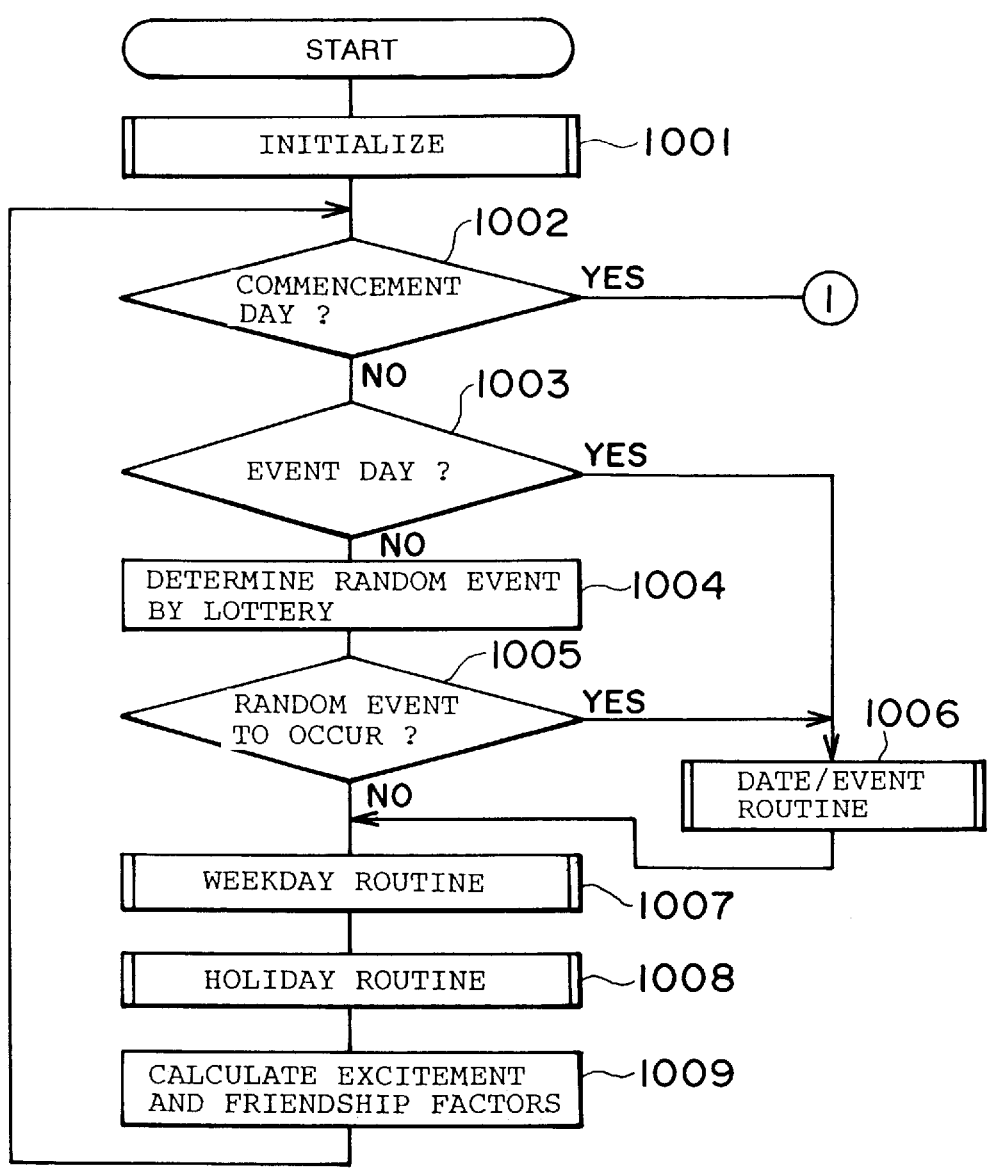
FIGS. 3 and 4 are flowcharts of a sequence of the video game according to the present invention.
Figure 4:
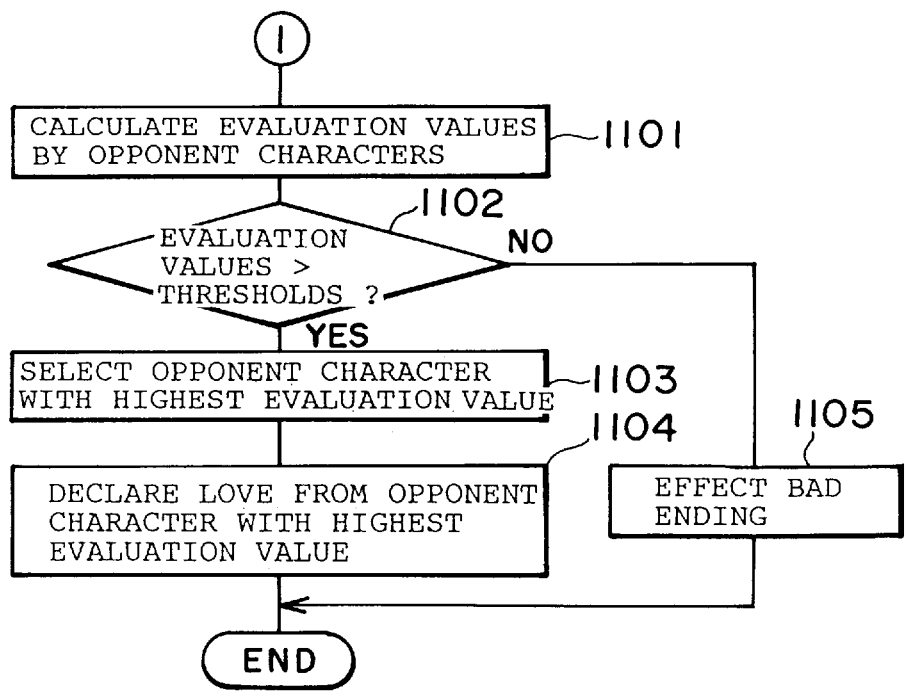

FIGS. 3 and 4 show a sequence of the video game according to the present invention which is performed by the video game system shown in FIGS. 1 and 2.

The video game according to the present invention, which will be described below as being performed by the video game system shown in FIGS. 1 and 2, is a role playing game (RPG) which is played by the player who enters commands to determine actions of a player character to control the player character to get along with a plurality of opponent characters of the opposite sex during three years of high school life which the player character experiences, in an effort for the player character to get a declaration of love from any one of the opponent characters on the day of the commencement.

For the player to start the game for the first time, an initializing routine for registering the name of the player character played by the player and other information is carried out in a step 1001 (FIG. 3). The initializing routine, which is shown in detail in FIG. 5, requires the player to enter a surname in a step 1201, enter an individual name in a step 1202, and enter a nickname in a step 1203. The name data thus entered are stored into a name storage area in the external memory 120.

After the initializing routine, days in the high school start being counted by a day counter from the day of the entrance ceremony of the high school. The day counter is included in the main memory 105. It is determined in a step 1002 whether the day of the commencement is reached or not based on the count of the day counter. If the day of the commencement is not reached in the step 1002, then it is determined in a step 1003 whether the present day reaches one of event days which have been addressed and registered in the main memory 105. If the present day reaches one of those event days, then an event such as a date, an athletic meeting, an excursion, etc. takes place in a date/event routine in a step 1006.

If the present day is not any one of the event days, then a random event is determined by lottery in a step 1004. A random event may, for example, be the appearance of a new opponent character, and the probability of such a random event varies dependent on the value of a parameter which the player character has, e.g., a parameter indicative of whether the player character is oriented to liberal arts, science, or the like. If a random event is determined to occur in a step 1005, then the player character dates a new opponent character in the step 1006.

If no random event is determined to occur in the step 1005, then a weekday routine is executed in a step 1007 or a holiday routine is executed in a step 1008, after which an excitement factor and a friendship factor are calculated in a step 1009. Control then returns from the step 1009 to the step 1002.

Figure 6:
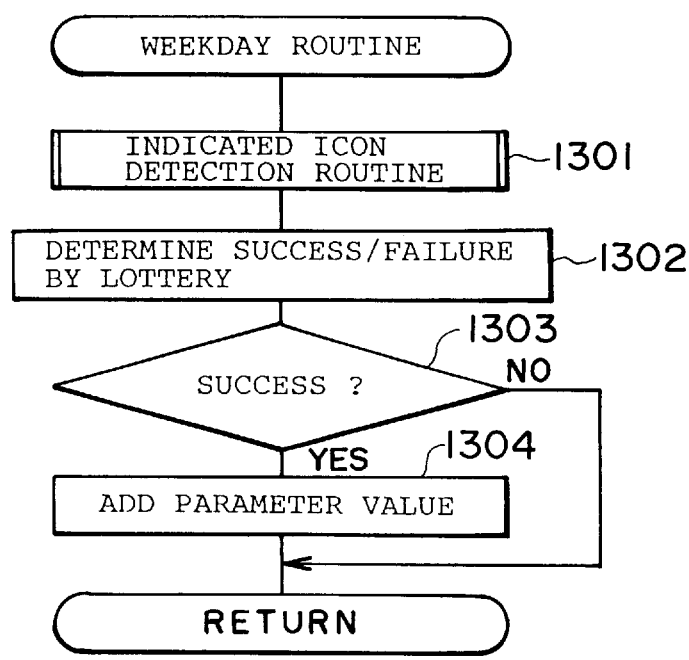
FIG. 6 is a flowchart of a weekday routine of the sequence shown in FIGS. 3 and 4.
Figure 7:
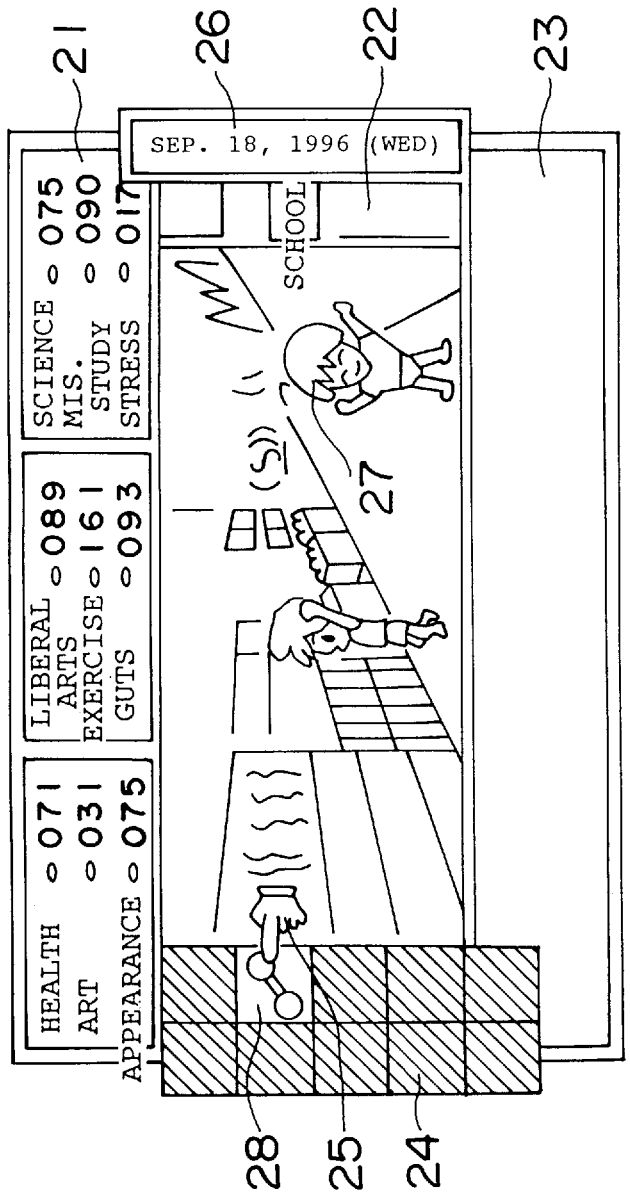
FIG. 7 is a view showing an image displayed on a television display monitor when the weekday routine shown in FIG. 5 is executed.

In the weekday routine, the player enters commands for making the player character more oriented to liberal arts, science, or art, or improving the appearance of the player character, and also enters commands to set a date on a holiday. The weekday routine is shown in detail in FIG. 6. When the weekday routine is executed, an image as shown in FIG. 7 is displayed on the television display monitor 122, allowing the player to indicate, with a cursor 25, one of displayed icons 24 which represent respective commands. When one of the icons 24 is indicated by the cursor 25, it is displayed at an enlarged scale as described later on.

After one of the icons 24, e.g., an exercise icon 28, is indicated by the cursor 25 in an indicated icon detection routine in a step 1301 (FIG. 6), and then a success/failure is determined by lottery in a step 1302. The indicated icon detection routine in the step 1301 will be described later on. Specifically, the step 1302 make calculations to determine whether the addition of a parameter value for the selected command, which represents an exercise ability here, is permitted (successful) or not with varying probability. If the addition of a parameter value for the selected command is permitted (successful), then the parameter of the exercise ability corresponding to the selected command is incremented by a predetermined number in a step 1304.

In the weekday routine, there is also available a command (telephone icon) for the player character to set a date with a desired opponent character on a holiday by telephone. If the player character is not liked by the opponent character for breaking a past date, for example, and hence the opponent character has very low friendship and excitement factors with the player character, then the proposal for a date may be denied.

Figure 8:
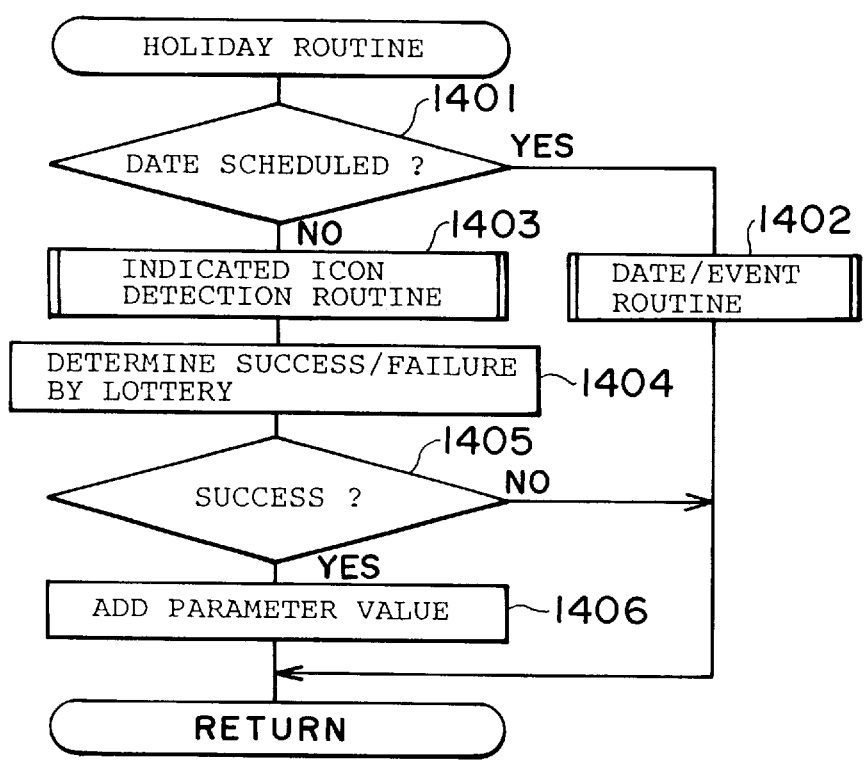
FIG. 8 is a flowchart of a holiday routine of the sequence shown in FIGS. 3 and 4.

The holiday routine is a routine for going out on a date which has been fixed in the weekday routine. The holiday routine is shown in detail in FIG. 8. As shown in FIG. 8, it is determined in a step 1401 whether a date has been scheduled for the present holiday or not. If a date has been scheduled for the present holiday, then a date/event routine is executed in a step 1402. If no date has been scheduled for the present holiday in the step 1401, then steps 1403, 1404, 1405, 1406 which are the same as the steps 1301, 1302, 1303, 1304 of the weekday routine shown in FIG. 6 are executed.

Figure 9:
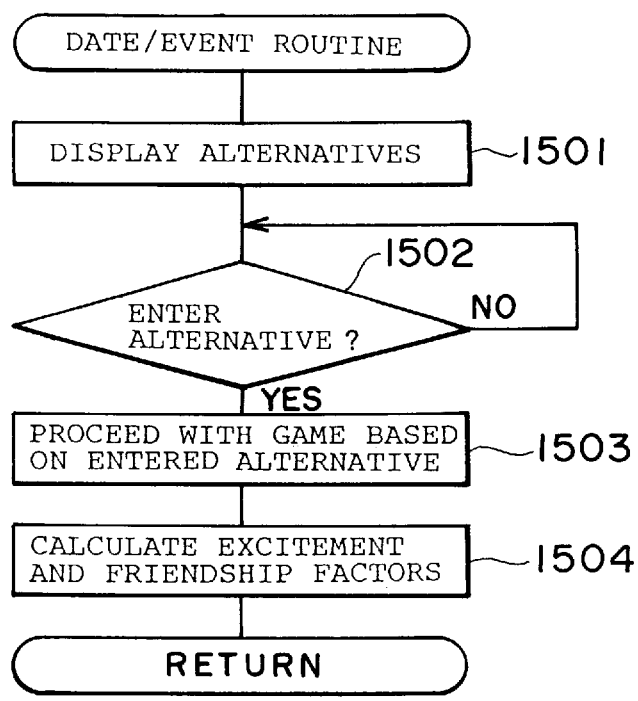
FIG. 9 is a flowchart of a date/event routine in the sequence shown in FIGS. 3 and 4.

The date/event routine in the step 1402, which is identical to the date/event routine in the step 1006, is shown in detail in FIG. 9.

As shown in FIG. 9, alternatives for conversations with the opponent character depending on the destination of the date are displayed in a step 1501. For example, if the destination of the date is an amusement park, then the player selects an attraction such as a roller coaster, a haunted house, a Ferris wheel, or the like. Each time the player selects and enters an alternative in a step 1502, the date goes on a step 1503. When the date is over, the friendship and excitement factors of the opponent character are calculated in a step 1504. For example, if the opponent character likes sports, then the friendship and excitement factors of the opponent character increase when the player selects a roller coaster as an attraction, and if the opponent character is fond of literature, then the friendship and excitement factors of the opponent character increase when the player selects a Ferris wheel as an attraction. The friendship and excitement factors vary depending on the season or the like, and hence do not necessarily increase at all times even when the player character repeats dating the same opponent character. Details of calculation of the friendship and excitement factors will be described later on.

If the day of the commencement is reached, i.e., if the number of days left before the day of the commencement is nil, in the step 1002, then control goes to a step 1101 shown in FIG. 4. As shown in FIG. 4, the parameters of the player character, which are indicative of whether the player character is oriented to liberal arts, science, or the like, are substituted in evaluation formulas provided for the respective opponent characters to calculate evaluation values by the respective opponent characters in a step 1101. The evaluation formulas differ from opponent character to opponent character depending on the personalities of the opponent characters. For example, if the opponent character likes sports, then the evaluation value by the opponent character is higher as the exercise ability of the player character is higher, and if the opponent character likes literature, then the evaluation value by the opponent character is higher as the player character is more oriented toward liberal arts.

The opponent characters have respective threshold values. It is determined in a step 1102 whether the evaluation values calculated for the respective opponent characters are higher than the respective threshold values.

Thereafter, the opponent character with the highest calculated evaluation value is selected among those opponent characters whose evaluation values have exceeded the threshold values in a step 1103. Then, the opponent character selected on the day of the commencement declares love to the player character in a step 1104.

If the evaluation values calculated for all the respective opponent characters are not higher than the respective threshold values in the step 1102, then a bad ending process is executed in a step 1105. In the bad ending process, the player character may get a declaration of love from an unexpected character of the same sex.

Therefore, the player enters commands to proceed with the game in an effort to increase the evaluation value by the opponent character from whom the player, i.e., the player character, wants to get a declaration of love. The player can thus enjoy the game in order to win a love though a simulated love experience.

In FIG. 7, the displayed image of the video game is vertically divided into three areas, i.e., an uppermost parameter display area 21, an intermediate image display area 22, and a lowermost conversation display area 23. The icons 24 are displayed on the left-hand side of the intermediate image display area 22.

The uppermost parameter display area 21 displays various parameters of the player character, indicated at 27 in the intermediate image display area 22. The displayed parameters can be varied when various commands are selected from the icons 24 with the cursor 25. For example, when the player operates the controller 121 to move the cursor 25, displayed as a pointed finger on the displayed image, to one of the icons 24 which represents a book, and then clicks on that icon 24, the value of the liberal arts quality of the player character 27 increases.

In FIG. 7, the exercise icon 28, which signifies an exercise and represents a dumbbell, is shown as being clicked on. When the exercise icon 28 is clicked on, the intermediate image display area 22 switches to an animated display in which the player character 27 is doing exercises, and the parameter value of the exercise ability of the player character 27 in the uppermost parameter display area 21 increases.

Though not specifically shown in FIG. 7, the icons 24 also include a rest icon for lowering the parameter value of stress, a telephone icon for inviting the opponent character for a date or obtaining information, a date icon for dating the opponent character as promised, a liberal arts study icon for increasing the parameter value of the player character's orientation to liberal arts, a science study icon for increasing the parameter value of the player character's orientation to science, an art study icon for increasing the parameter value of the player character's orientation to art, an appearance icon for increasing the parameter value of the player character's appearance, and other icons.

A date indication area 26 is displayed on the right-hand side of the intermediate image display area 22 for indicating a date in the video game.

As described above, the video game according to the present invention is played by the player who controls the displayed player character during three years of high school life in an effort to fall in love with the opponent character. Specifically, the player enters commands to increase the various parameter values through study and exercises on weekdays and go out for a date with the opponent character on holidays in order to promote the opponent character's affectionate feelings for the player character.

A process of controlling the display of an icon will be described below with reference to FIGS. 10 and 11(a) through 11(e).

Figure 10:
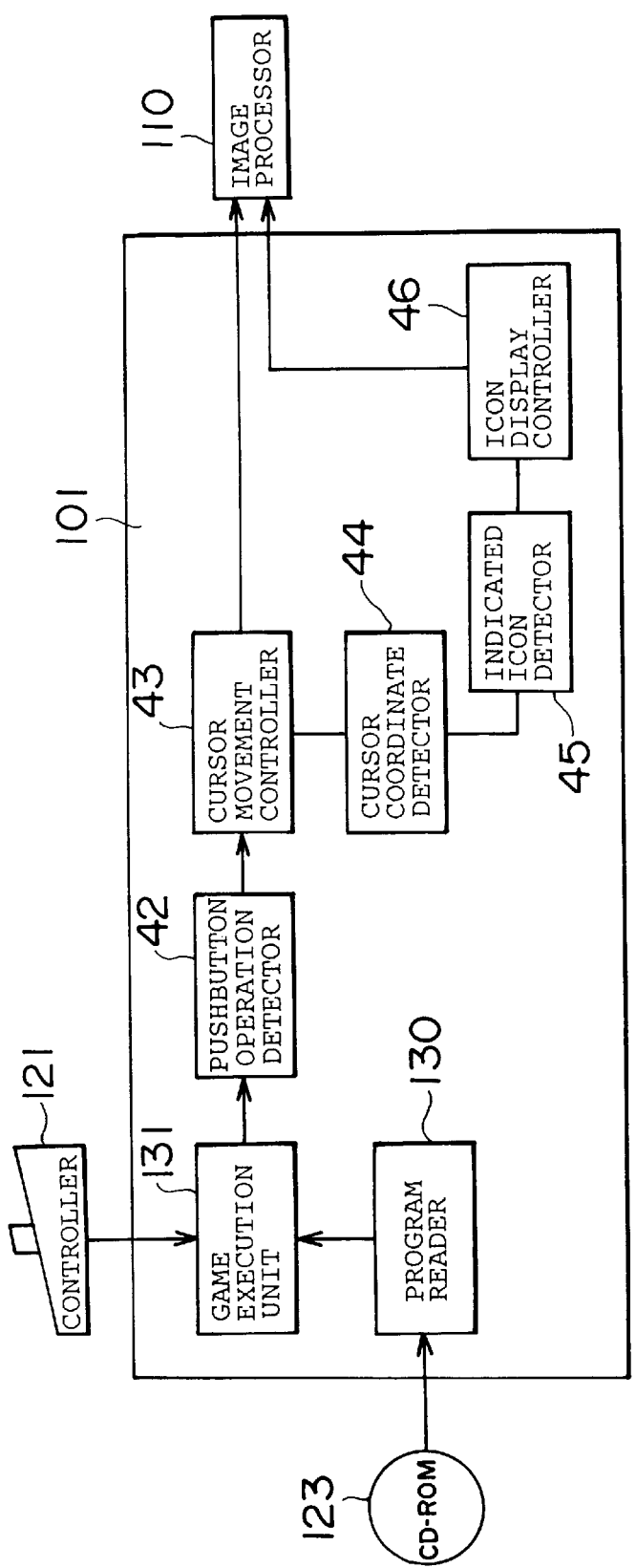
FIG. 10 is a detailed block diagram of an electric arrangement of a CPU for controlling the display of an icon.
Figure 11:
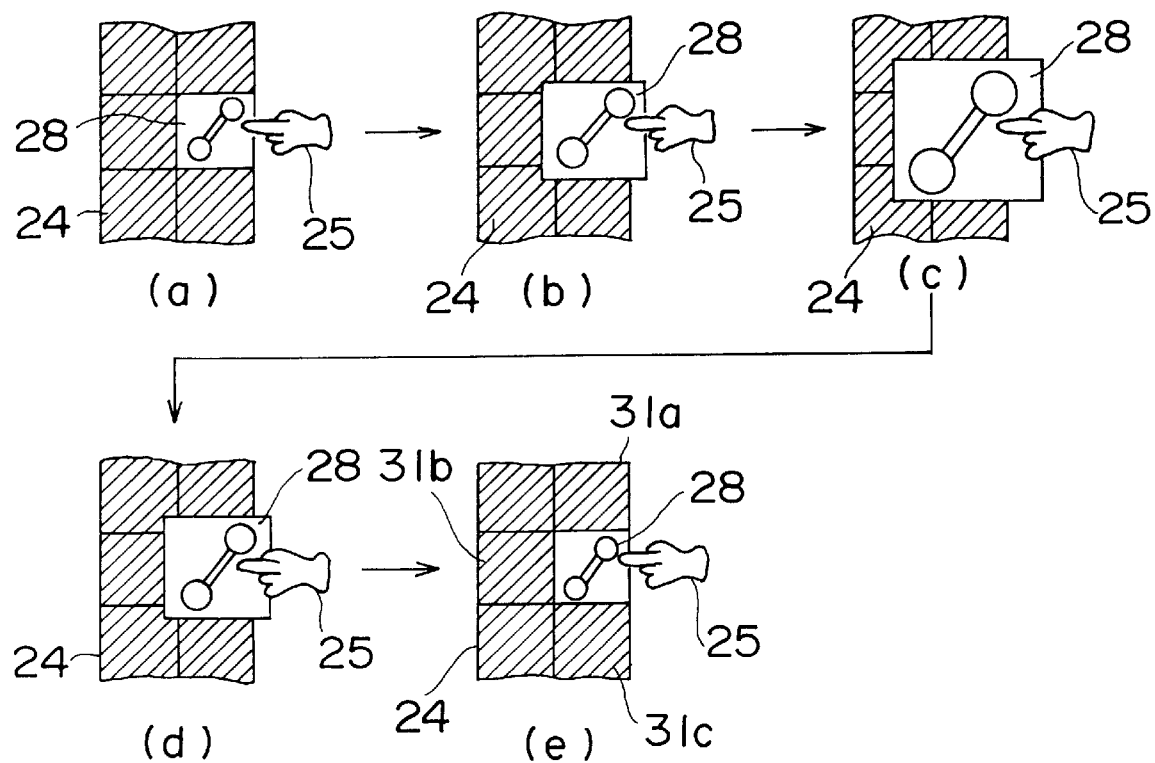
FIGS. 11(a) through 11(e) are fragmentary views showing the manner in which an icon is displayed in progressively enlarged and reduced sizes.

FIG. 10 shows in detailed block form an electric arrangement of the CPU 101 for controlling the display of an icon.

As shown in FIG. 10, the game program is read from the CD-ROM 123 by a program reader 130 and transferred to a game execution unit 131, which executes the video game.

While the video game is being executed, a pushbutton operation detector 42 monitors, through the game execution unit 131, the status of the cross key 121g of the controller 121. When the cross key 121g is pressed in either direction, the pushbutton operation detector 42 detects the pressed direction and informs a cursor movement controller 43 of the detected information. The cursor movement controller 43 then transfers the detected directional information to the image processor 110, enabling the image processor 110 to move the cursor 25 on the displayed image in the direction specified by the cross key 121g for a period of time during which the cross key 121g has been pressed.

A cursor coordinate detector 44 detects the coordinate position of the cursor 25 on the displayed image, and transmits the detected coordinate information to an indicated icon detector 45. Based on the detected coordinate information from the cursor coordinate detector 44, the indicated icon detector 45 detects which one of the icons 24 is indicated by the cursor 25 and instructs an icon display controller 46 to control the image processor 110 to display the indicated icon at an enlarged scale.

FIGS. 11(a) through 11(e) show the manner in which the icon 28 is displayed in progressively enlarged and reduced sizes.

As shown in FIGS. 11(a) through 11(c), the icon display controller 46 displays the icon 28 indicated by the cursor 25 in progressively enlarged sizes. To display the icon 28 in progressively enlarged sizes, the icon display controller 46 may have a memory for storing an animated image representing the progressively enlarged states of the respective icons, and outputting such an animated image. As shown in FIGS. 11(c) through 11(e), after the icon display controller 46 has displayed the icon 28 in progressively enlarged sizes, it displays the icon 28 in progressively reduced sizes back to its original size. To display the icon 28 in progressively reduced sizes, the memory of the icon display controller 46 may store an animated image representing the progressively reduced states of the respective icons, and output such an animated image. It is preferable to complete the display of the icon 28 in progressively enlarged and reduced sizes as shown in FIGS. 11(a) through 11(e) within a period of time, e.g., 1~2 seconds, which is long enough for the player to confirm the command, here the exercise command, represented by the icon 28. If the icon 28 were displayed in the enlarged size continuously for a longer period of time, then the enlarged icon 28 would pose a visual obstacle to moving the cursor 25 to adjacent icons 24 which are denoted as 31a, 31b, 31c in FIG. 11(e).

Figure 12:
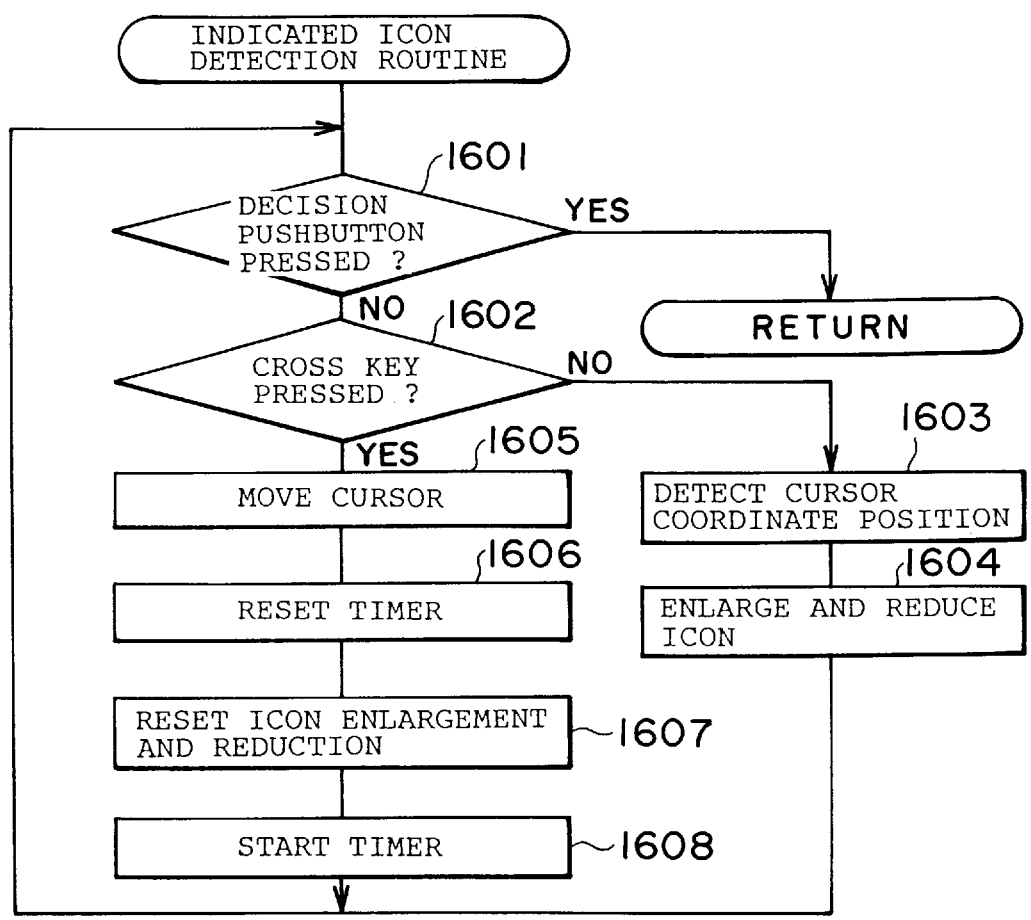
FIG. 12 is a flowchart of an indicated icon detection routine in the sequence shown in FIGS. 3 and 4.

FIG. 12 shows in detail the indicated icon detection routine in the step 1301, which is executed by the CPU 101, the controller 121, and the image processor 110 as shown in FIG. 10.

When the icon indication detection process is initiated, a timer is started which may be software-implemented in the main memory 105 in synchronism with the clock frequency.

If either one of the pushbuttons 121a~121f (also referred to as decision pushbuttons) of the controller 121 is pressed in a step 1601, then an icon which is indicated by the cursor 25 is not displayed in progressively enlarged and reduced sizes, but a command represented by the indicated icon is processed. If either one of the decision pushbuttons 121a~121f is not pressed, then it is determined whether the cross key 121g is pressed or not in a step 1602. If the cross key 121g is not pressed, then the time measured by the timer is read. If the time measured by the timer exceeds a predetermined period of time, then the cursor coordinate detector 44 detects the coordinate position of the cursor 25 in a step 1603, and the icon display controller 46 controls the image processor 110 to display the icon indicated by the cursor 25 in progressively enlarged and reduced sizes in a step 1604. Stated otherwise, if the cursor 25 remains positioned on a certain icon for a certain period of time, e.g., 0.5~1 second, then the icon indicated by the cursor 25 is displayed in progressively enlarged and reduced sizes. Therefore, the player can easily confirm the indicated icon for efficiently determining the command represented by the indicated icon.

If the cross key 121g is pressed in the step 1602, then the cursor movement controller 43 controls the image processor 110 to move the cursor 25 in a step 1605. Thereafter, the timer is reset in a step 1606, and the process of displaying icons in progressively enlarged and reduced sizes is reset in a step 1607, after which the timer is started in a step 1608.

The video game described above allows the player to enter commands efficiently because the selected command is displayed in progressively enlarged and reduced sizes, and also enables the player to easily experience the role played by the player character in relation to the opponent character. Therefore, the player is able to play the video game without losing interest therein for a long period of time.

Figure 13:
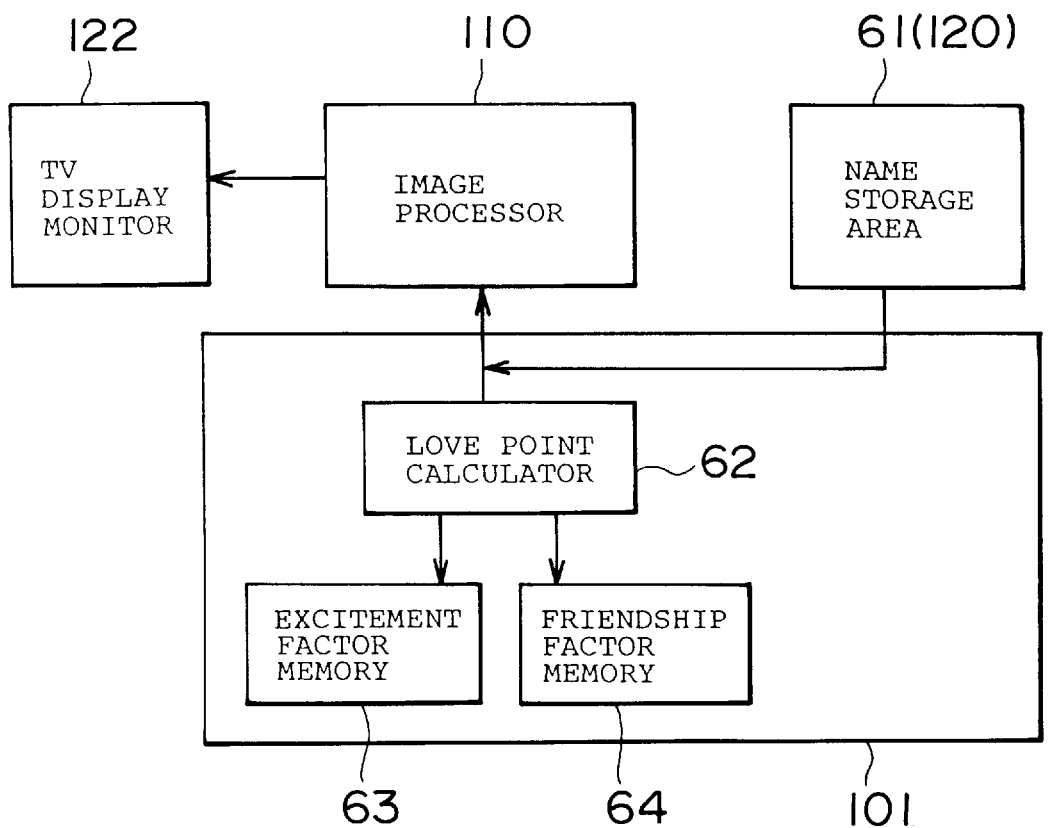
FIG. 13 is a block diagram of a video game system for playing a video game according to another embodiment of the present invention.

FIG. 13 shows in block form a video game system for playing a video game according to another embodiment of the present invention. The video game system shown in FIG. 13 is similar to the video game system shown in FIGS. 1 through 12, except that it performs a video game, typically a role playing game identical to the role playing game described above with reference to the first embodiment, while the opponent character calls the player character different names.

Figure 14:
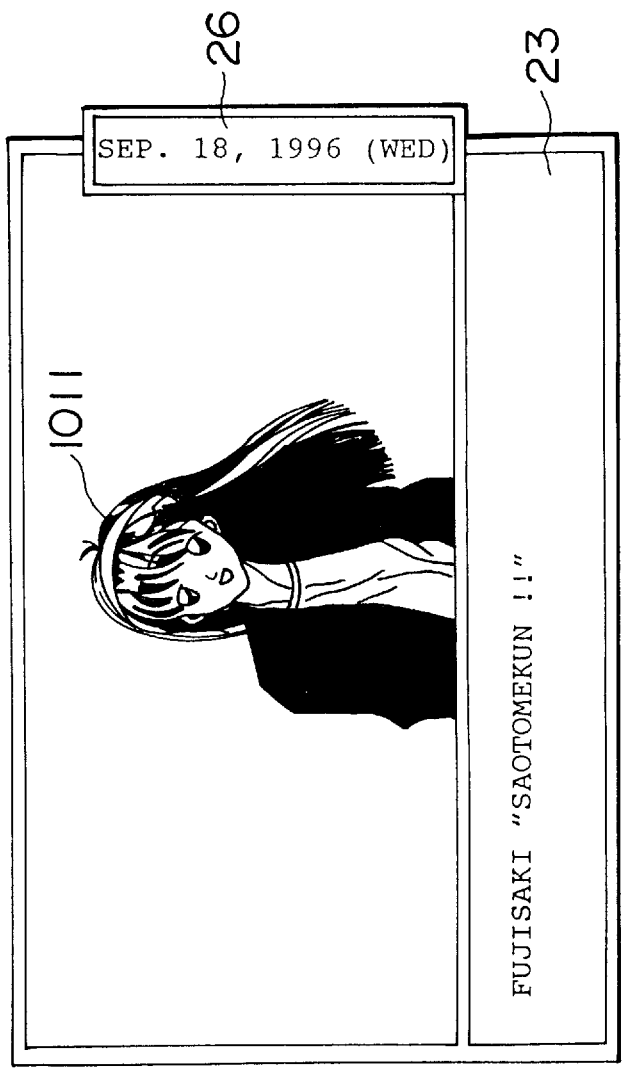
FIG. 14 is a view showing an image displayed on the television display monitor when the video game according to the other embodiment of the present invention is played.

Specifically, as shown in FIG. 14, the lowermost conversation display area 23 of the displayed image of the video game displays character information representing a name which a displayed opponent character 1011 calls the player character. The displayed name which the displayed opponent character 1011 calls the player character is selected from a list of several alternatives depending on the friendship and excitement factors which the opponent character 1011 has with the player character.

Figure 5:
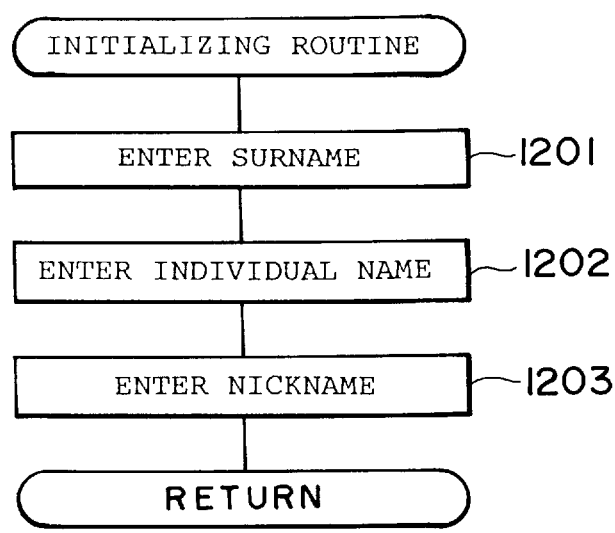
FIG. 5 is a flowchart of an initializing routine of the sequence shown in FIGS. 3 and 4.

When the video game is started, the player registers a surname, an individual name, and a nickname as shown in FIG. 15 in the initializing routine which is shown in FIG. 5. The entered names are stored in a name storage area 61 (see FIG. 13) in the external memory 120.

The name which the displayed opponent character 1011 calls the player character is selected from the stored names as follows:

In this role playing game, the affectionate feelings which the opponent character 1011 has for the player character are determined by the friendship and excitement factors, as described above. These friendship and excitement factors are not indicated to the player. If only the excitement factor increases, the opponent character 1011 considers the player character too much as a member of the opposite sex, and becomes too tense. If only the friendship factor increases, the opponent character 1011 becomes just a friend of the player character. At any rate, it is difficult for the player character to win a love.

The excitement factor can be increased by increasing the parameter values of the player character's exercise ability, orientation to liberal arts, orientation to science, the appearance, etc. to make the opponent character 1011 think more of the player character. The friendship factor can be increased by the number of dates and the agreement of tastes in conversations between the opponent character 1011 and the player character. However, the rate at which these excitement and friendship factors increase depends on the personality of the opponent character 1011, and varies from opponent character to opponent character.

As shown in FIG. 13, the excitement factor and the friendship factor are recorded respectively in a excitement factor memory 63 and a friendship factor memory 64 in the CPU 101, and are updated from time to time. The excitement factor memory 63 and friendship factor memory 64 may be included in either the main memory 105 (see FIG. 2) or the external memory 120.

Figure 16:
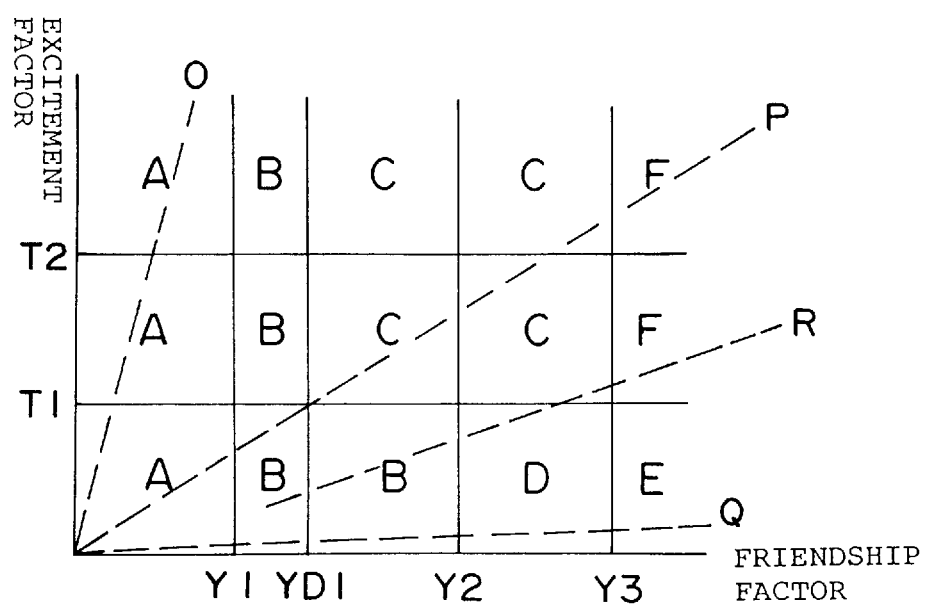
FIG. 16 is a diagram showing divided ranges of excitement and friendship factors and different love curves of an opponent character in the video game according to the other embodiment of the present invention.

As shown in FIG. 16, the excitement factor is divided into three ranges, and the friendship factor is divided into five ranges. These ranges jointly make up a total of 15 zones to each of which one of levels or ranks A~E (described below) is assigned.

The opponent character has alternative different love curves O, P, R, Q which may be linear as shown or non-linear, depending on the excitement and friendship factors. The love curves O, P, Q have a starting point at the origin, but the love curve P has a starting in the level B.

FIG. 17 shows a table of names corresponding to the respective levels A~E. The table of names may be stored in the name storage area 61 in the external memory 120.

As shown in FIGS. 16 and 17, in the levels A and B when the video game has just begun, the opponent character 1011 calls the player character either "surname+SAN" or "surname+KUN". Since the initially entered surname is "SAOTOME" as shown in FIG. 15, the opponent character 1011 calls the player character either "SAOTOMESAN" (level A) or "SAOTOMEKUN" (level B). When the friendship factor does not increases, but only the excitement factor increases as indicated by the love curve O in FIG. 16, the opponent character 1011 has affectionate feelings for the player character, but is too tense to change the way it calls the player character, and continuously calls the player character "SAOTOMESAN" (level A). Alternatively, the opponent character may not call the player character at all.

When both the excitement and friendship factors increase in balance as indicated by the love curve P in FIG. 16, the name which the opponent character 1011 calls the player character changes from "surname+SAN" ("SAOTOMESAN" (level A)) to "surname+KUN" ("SAOTOMEKUN" (level B)) to "individual name+SAN" ("YOSHIOSAN" (level C)) to "nickname" ("YOCCHIN" (level F)).

When the excitement factor does not increases, but only the friendship factor increases as indicated by the love curve Q in FIG. 16, the name which the opponent character 1011 calls the player character changes from "surname+SAN" ("SAOTOMESAN" (level A)) to "surname+KUN" ("SAOTOMEKUN" (level B)) to "individual name+KUN" ("YOSHIOKUN" (level D)) to "individual name" ("YOSHIO" (level E)). In this case, the player character is a simple good friend of the opponent character 1011.

In FIG. 13, the CPU 101 has a love point calculator 62 which calculates a love point, i.e., one of the zones in FIG. 16, from the excitement factor stored in the excitement factor memory 63 and the friendship factor stored in the friendship factor memory 64. The image processor 110 has a conversion table for converting the calculated love point into a corresponding one of the levels A~E. Therefore, the image processor 110 converts the love point calculated by the love point calculator 62 into a corresponding one of the levels A~E. Then, the image processor 110 reads a name corresponding to the determined level from the name storage area 61, and displays the name in the conversation display area 23, as shown in FIG. 14. In FIG. 14, the name at the level B is displayed in the conversation display area 23.

Although certain preferred embodiments of the present invention have been shown and described in detail, it should be understood that various changes and modifications may be made therein without departing from the scope of the appended claims.

What is claimed is:

1. A method of assisting a player of a video game in entering commands to determine an action of a player character for thereby determining an action and an image of at least one opponent character in the video game, comprising the steps of:

displaying a plurality of icons representing respective commands for the player character and a movable cursor on a displayed image;

detecting the movable cursor positioned on one of said icons; and enlarging said one of the icons in size based on the detected movable cursor to assist a player of the video game in entering the command represented by said one of the icons.

2. A method according to claim 1, further comprising the step of:

reducing said one of the icons in size a predetermined period of time after said one of the icons is enlarged in size.

3. A method according to claim 2, wherein said one of the icons is reduced in progressively smaller sizes.

4. A method according to claim 1, wherein said one of the icons is enlarged in progressively greater sizes.

5. A video game system comprising:

display means for displaying a player character whose action is determined by at least entering commands, an opponent character action and image are determined by the action of the player character, a plurality of icons representing said commands, respectively, and a movable cursor;

a controller for moving the displayed movable cursor to indicate one of said icons to enter the command represented by said one of the icons;

detecting means for detecting the position of the displayed movable cursor; and display control means for displaying said one of the icons in an enlarged size based on the position detected by said detecting means.

6. A video game system according to claim 5, wherein said display control means comprises means for displaying said one of the icons in a reduced size a predetermined period of time after said one of the icons is displayed in the enlarged size.

7. A video game system according to claim 6, wherein said display control means comprises means for displaying said one of the icons in progressively smaller sizes.

8. A video game system according to claim 5, wherein said display control means comprises means for displaying said one of the icons in progressively greater sizes.

9. A video game storage medium storing a video game program of a video game which is played by entering commands to determine an action of a player character for thereby determining an action and an image of at least one opponent character in the video game, displaying a plurality of icons representing respective commands for the player character and a movable cursor on a displayed image, detecting the movable cursor positioned on one of said icons, and enlarging said one of the icons in size based on the detected movable cursor.

10. A video game storage medium according to claim 9, said one of the icons is reduced in size a predetermined period of time after said one of the icons is enlarged in size.

11. A video game storage medium according to claim 9, wherein said one of the icons is enlarged in progressively greater sizes.

12. A video game storage medium according to claim 11, wherein said one of the icons is reduced in progressively smaller sizes.

13. A method of controlling a video game to determine an action of a player character for thereby determining an action and an image of at least one opponent character in the video game, comprising the steps of:

establishing a plurality of zones depending on excitement and friendship factors of the opponent character with respect to the player character;

selecting an action of the player character to increase affectionate feelings of the opponent character for the player character according to a characteristic curve of the opponent character; and determining an action of the opponent character toward the player character based on one of said zones which is traversed by said characteristic curve of the opponent character.

14. A method according to claim 13, wherein each of said zones is associated with one of a plurality of different levels representing respective different names of the player character, and said action of the opponent character comprises a presentation of one of said names which is associated with said one of the zones.

15. A method according to claim 13, wherein said opponent character has a plurality of alternative different characteristic curves selectable depending on said excitement and friendship factors.

* * * * *

UNITED STATES PATENT AND TRADEMARK OFFICE
CERTIFICATE OF CORRECTION

PATENT NO.   : 5,807,174
DATED        : September 15, 1998
INVENTOR(S)  : Kenichi FUKUHARA et al.

It is certified that error appears in the above-identified patent and that said Letters Patent is hereby corrected as shown below:

On the title page
At item [75] Inventors, line 3, (column 1, line 8) of the printed patent, "Chofu" should be —Tokyo—.

Signed and Sealed this

Twenty-sixth Day of October, 1999

Attest:

Q. TODD DICKINSON

*Attesting Officer*  *Acting Commissioner of Patents and Trademarks*